United States Patent Office 3,470,151
Patented Sept. 30, 1969

3,470,151
FURYL- AND THIENYL-PENICILLINS AND SALTS THEREOF
Frank Peter Doyle and John Herbert Charles Nayler, Surrey, England, assignors to Beecham Group Limited, Brentford, Middlesex, England, a British company
No Drawing. Continuation-in-part of application Ser. No. 267,910, Mar. 26, 1963. This application May 17, 1966, Ser. No. 550,626
Int. Cl. C07d 99/22; A61k 21/00
U.S. Cl. 260—239.1      14 Claims

ABSTRACT OF THE DISCLOSURE

Substituted furyl and thienyl penicillins having high antibacterial activity and good minimum inhibitory concentrations are provided.

---

This application is a continuation-in-part of application Ser. No. 267,910, filed Mar. 26, 1963, which is, in turn, a division of application Ser. No. 97,155, filed Mar. 21, 1961, and now abandoned.

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to novel penicillins and nontoxic salts thereof.

Antibacterial agents such as benzylpenicillin have proven highly effective in the past in the therapy of infections due to Gram-positive bacteria, but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentate the action of benzylpenicillin when admixed therewith or are safe for use in patients who cannot be given benzylpenicillin because they exhibit allergic reactions thereto.

There is provided, according to the present invention, a member selected from the group consisting of an acid having the formula:

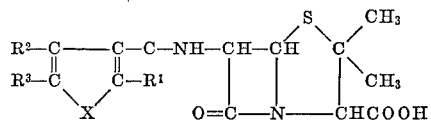

wherein X is a divalent radical selected from the group consisting of:

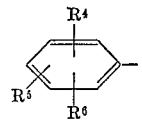

wherein $R^1$ and $R^2$ each represent a member selected from the group consisting of nitro, (lower)alkyl, (lower)alkoxy, acylamino [where the acylating agent is an aliphatic carboxylic acid containing from one to ten carbon atoms inclusive and thus may also be named (lower)alkanoylamino], chloro, bromo, iodo, fluoro, hydroxy, (lower)alkylthio, cyclohexyl, cyclopentyl, cycloheptyl, aryloxy [including phenoxy, chlorophenoxy, bromophenoxy, (lower)alkylphenoxy, e.g. tolyloxy and (lower)alkoxyphenoxy, e.g. methoxyphenoxy, etc.], aralkyl (including benzyl, α- and β-phenethyl, and α- and β- and γ-phenylpropyl, etc.), arylthio [including phenylthio, chlorophenylthio, (lower)alkylphenylthio, (lower)alkoxyphenylthio, etc.] and aryl [including phenyl, nitrophenyl, chlorophenyl, bromophenyl, (lower)alkylphenyl, (lower)alkoxyphenyl, etc.], aralkyloxy, aralkylthio, acyl, acyloxy, $R^3$ represents a member selected from the group consisting of hydrogen, nitro, (lower)alkyl, (lower)alkoxy, acylthio, alkoxycarbonyl, mercapto, alkylsulfonyl, and acylamino [where the acylating agent is an aliphatic carboxylic acid containing from one to ten carbon atoms inclusive and thus may also be named (lower)alkanoylamino], chloro, bromo, iodo, fluoro, hydroxy, (lower)alkylthio, cyclohexyl, cyclopentyl, cycloheptyl, aryloxy [including phenoxy, chlorophenoxy, bromophenoxy, (lower)alkylphenoxy, e.g. tolyloxy and (lower)alkoxyphenoxy, e.g. methoxyphenoxy, etc.], aralkyl (including benzyl, α- and β-phenethyl, and α- and β- and γ-phenylpropyl, etc.), arylthio [including phenylthio, chlorophenylthio, (lower)alkylphenylthio, (lower)alkoxyphenylthio, etc.] and aryl [including phenyl, nitrophenyl, chlorophenyl, bromophenyl, (lower)alkylphenyl, (lower)alkoxyphenyl, etc.], aralkyloxy, aralkylthio, acyl, acyloxy, acylthio, alkoxycarbonyl, mercapto, alkylsulfonyl and when bonded together as a benz group, $R^2$ and $R^3$ each represent vinyl; and nontoxic pharmaceutically acceptable salts thereof. Said salts include the sodium, potassium, calcium, aluminum and ammonium salt and substituted ammonium salts, e.g. salts of such nontoxic amines as trialkylamines, including triethylamine, procaine, dibenzylamine, N-benzyl-β-phenethylamine, 1-ephenamine, N,N'-dibenzylethylenediamine, dehydroabietylamine, N,N'-bisdehydroabietylethylenediamine, N - (lower)alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g. "(lower)alkoxy," it refers to the alkyl portion of such group which is therefore as described above in connection with "(lower)alkyl." The term "aryl" as used herein (in the terms "aryl," "arylthio" and "aryloxy") refers to the phenyl radical per se and to substituted phenyl radicals of the formula:

wherein R⁴, R⁵ and R⁶ each represent a member selected from the group consisting of hydrogen, fluoro, chloro, bromo, iodo, trifluoromethyl, (lower)alkyl, (lower)alkoxy, hydroxy, nitro and amino. Also included within the scope of the present invention are easily hydrolyzed esters which are converted to the free acid form by chemical or enzymatic hydrolysis.

A preferred embodiment of the present invention is a member selected from the group consisting of an acid having the formula:

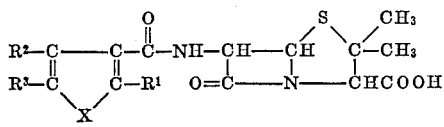

wherein X is a divalent radical selected from the group consisting of

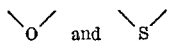

wherein R¹ and R² each represent a member selected from the group consisting of (lower)alkyl, chloro, bromo and the radical having the formula:

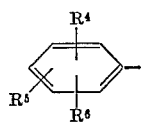

wherein R⁴, R⁵ and R⁶ each represent a member selected from the group consisting of hydrogen, fluoro, bromo and chloro, and R³ represents a member selected from the group consisting of hydrogen, (lower)alkyl and the radical having the formula:

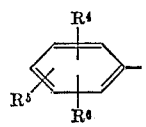

wherein R⁴, R⁵ and R⁶ each represent a member selected from the group consisting of hydrogen, fluoro, bromo and chloro and, when bonded together as a benz group, R² and R³ each represent vinyl; and nontoxic pharmaceutically acceptable salts thereof.

Particularly preferred embodiments of the present invention are acids having the formula:

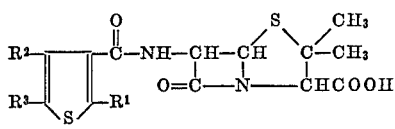

wherein of the groups R¹ and R² one group represents (lower)alkyl and the other group is a monovalent radical of the formula:

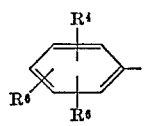

wherein R⁴, R⁵ and R⁶ are each hydrogen, bromo or chloro, and R³ is hydrogen or (lower)alkyl; and nontoxic, pharmaceutically acceptable salts thereof, and particularly those compounds wherein R³ is hydrogen and acids having the formula:

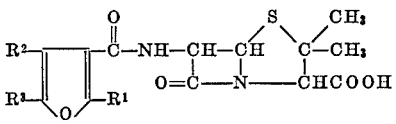

wherein of the groups R¹ and R² one group represents (lower)alkyl and the other group is a monovalent radical of the formula:

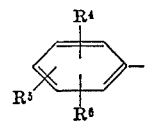

wherein R⁴, R⁵ and R⁶ are each hydrogen, bromo or chloro, and R³ is hydrogen or (lower)alkyl; and nontoxic, pharmaceutically acceptable salts thereof, and more particularly those compounds wherein R³ is hydrogen and compounds having the formula:

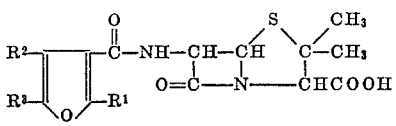

wherein R¹, R² and R³ represent (lower)alkyl; and nontoxic, pharmaceutically acceptable salts thereof.

The products of the present invention are prepared by reaction of 6-aminopenicillanic acid, preferably in the form of a neutral salt such as the sodium salt or the triethylamine salt, with an acid chloride having the formula:

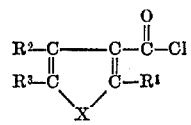

wherein X, R¹, R² and R³ have the meaning set forth above or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Additional compounds, which are hindered 3-furylpenicillins, are set forth below and have the following formula:

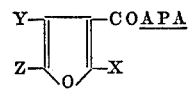

the meanings of X, Y and Z being given in the table below.

The penicillins shown in the table were all prepared by treating an aqueous solution of the sodium salt of 6–APA with the appropriate acid chloride in acetone, essentially as described in Example 2 of U.S. application Ser. No. 267,110. The side-chain acids were prepared by the general method of Gonzalez et al. (Anales real Soc. espan. Fis. Quim., 1954, 50B, 407), details for individual acids being given by Hanson et al. (J. Chem. Soc., 1965, 5984).

| X | Y | Z | M.I.C. (mcg./ml.) | |
|---|---|---|---|---|
| | | | Sensitive Staph. | Resistant Staph. |
| Et | Me | Me | 1.25 | 125 |
| CHMe$_2$ | Me | Me | 1.25 | 50 |
| Me | Et | Et | 0.5 | 25 |
| Me | Pr$^a$ | Pr$^a$ | 1.25 | 25 |
| Ph | Me | H | 0.25 | 1.25 |
| pClC$_6$H$_4$ | Me | H | 0.25 | 1.25 |
| Me | Ph | H | 0.25 | 0.5 |
| Me | pClC$_6$H$_4$ | H | 0.1 | 0.5 |
| Me | oClC$_6$H$_4$ | H | 0.25 | 0.5 |

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g. 20 ml.) and if desired, 2 ml. pure, dry acetone for about thirty minutes in the cold, e.g. at about 4° C. To this solution of the mixed anhydride there is then added a chilled solution of 0.01 mole 6-aminopenicillanic acid and 0.01 mole tertiary hydrocarbonyl amine, e.g. triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g. 5 N H$_2$SO$_4$ to pH 2. The free acid is then extracted into a water-immiscible, neutral organic solvent such as ether and the extract is washed with water quickly in the cold, if desired, and dried, as with anhydrous Na$_2$SO$_4$. The product in the ethereal extract in its free acid form is then converted to any desired metal or amine salt by treatment with the appropriate base, e.g. a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g. for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g. two portions of 25 mls.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperture chosen for the process of preparation of the derivatives of penicillanic acid should in general not exceed 30° C. and in many cases a suitable temperature is ambient temperature. Since the use of strongly acid or alkaline condition in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently, it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g. solid and liquid or two liquid phases.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g. procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g. pH 2) into diethyl ether, drying the ether and adding at least one equivalent of a solution of potassium 2-ethylhexanoate (e.g. 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257–258, Jan. 24, 1959) or Belgian Patent 569,728.

Aqueous acetone is often a convenient solvent for the reaction, but anhydrous organic solvents together with an organic base may also be employed. Both solvent and base should be chosen so as not, themselves, to react preferentially with the reagent being employed. Acetone and triethylamine or chloroform and triethylamine have been found to be particularly useful.

It is sometimes preferred to prepare the new penicillins from a fermentation liquor containing 6-aminopenicillanic acid or one of its intermediate concentrates. Examples of carboxylic acids which are employed to prepare some of the new penicillins are:

2,4-dimethylfuran-3-carboxylic acid,
2,4-dimethylthiophene-3-carboxylic acid, and
2-ethylbenzofuran-3-carboxylic acid.

The invention is illustrated by the following non-limitative examples.

EXAMPLE 1

2,4,5-triphenyl-3-furylpenicillin (sodium salt)

A solution of 2,4,5-triphenyl-3-furoyl chloride (5.77 gms.) in dry acetone (95 mls.) was added during 15 minutes to a stirred solution of 6-aminopenicillanic acid (3.46 gms.) in 3% aqueous sodium bicarbonate (135 mls.) and acetone (40 mls.). The mixture was stirred for four hours and then filtered. The filtrate was extracted with ether (2×150 mls.). The aqueous phase was then covered with ether (75 mls.) and brought to pH 2 by adding dilute hydrochloric acid. The layers were separated and the aqueous phase was extracted with two further 50 mls. portions of ether. The combined ether extracts (which at this stage contained the free penicillin acid) were washed with water (3×25 mls.), and then shaken with sufficient 8% sodium bicarbonate solution to give a neutral aqueous phase (pH 7). The neutral aqueous layer was separated, washed with ether, and evaporated at low temperature and pressure. The residue was dried in vacuo over phosphorus pentoxide to leave the crude sodium salt of 2,4,5-triphenyl-3-furylpenicillin as a white powder (7.42 gms.). Colorimetric assay with hydroxylamine against a benzylpenicillin standard indicated a purity of 36%.

The product inhibited Staph. Oxford at 5 mcg./ml., Staph .1 at 25 mcg./ml., and Staph. 2 at 25 mcg./ml.

The 2,4,5-triphenyl-3-furoyl chloride used in this experiment was prepared by warming the corresponding acid with thionyl chloride and a trace of pyridine, removing excess reagent in vacuo, and crystallizing the residue from light petroleum to give colorless needles M.P. 97–98°.

EXAMPLE 2

2,4,5-trimethyl-3-furylpenicillin

A solution of 2,4,5-trimethyl-3-furoyl chloride (3.45 gms.) in dry acetone (120 mls.) was added during 10 minutes to a stirred solution of 6-aminopenicillanic acid (4.33 gms.) in 3% aqueous sodium bicarbonate, (168 mls.) and acetone (50 mls.). The mixture was stirred for 3½ hours. It was extracted with ether (2×150 mls.) only the aqueous phase being retained. The latter was covered with ether (50 mls.) and adjusted to pH 2 by adding N hydrochloric acid. The layers were separated and the ether layer was washed with water (2×25 mls.). The ether solution, containing the free penicillin acid, was shaken with sufficient N aqueous sodium bicarbonate to give a neutral aqueous phase (pH 7). The aqueous layer was separated, washed with ether, and evaporated at low temperature and pressure to leave a straw-colored residue of the crude sodium salt of 2,4,5-trimethyl-3-furylpenicillin (1.33 gms.).

Colorimetric assay with hydroxylamine against a benzylpenicillin standard indicated it to be about 42% pure.

It inhibited Staph. Oxford at a concentration of 0.6 mcg./ml.

The 2,4,5-trimethyl-3-furoyl chloride, B.P. 39–41°/0.02 mm., was prepared from the corresponding acid and thionyl chloride.

EXAMPLE 3

4,5-dimethyl-2-phenyl-3-furylpenicillin

A solution of 4,5-dimethyl-2-phenyl-3-furoyl chloride (3.0 gms.) in dry chloroform (16 mls.) was added during 10 minutes to a stirred suspension of 6-aminopenicillanic acid (2.6 gms.) in dry chloroform (60 mls.) containing triethylamine (5.1 mls.). The mixture was stirred for four hours, then filtered. The chloroform solution was shaken with N hydrochloric acid to give an aqueous phase of pH 2, only the chloroform phase being retained. The latter was washed with water (2×50 mls.).

The chloroform solution was shaken with the theoretical amount of N aqueous sodium bicarbonate solution (12 ml.) to give a thick yellow emulsion which was evaporated at low temperature and pressure to leave a solid residue of the crude sodium salt of 4,5-dimethyl-2-phenyl-3-furylpenicillin (4.63 gms.).

Colorimetric assay with hydroxylamine against a benzylpenicillin standard indicated it to be about 48% pure.

It inhibited Staph. Oxford at a concentration of 1.25 mcg./ml., the benzylpenicillin-resistant Staph. 1 at 6 mcg./ml., and the benzylpenicillin-resistant Staph. 2 at 5 mcg./ml.

The 4,5-dimethyl-2-phenyl-3-furoyl chloride, B.P. 98–100°/0.01 mm., was prepared by warming 4,5-dimethyl-2-phenyl-3-furoic acid with thionyl chloride. The acid, M.P. 145–147°, was itself obtained by condensing acetoin with ethyl benzoylacetate in the presence of anhydrous zinc chloride, followed by saponification of the resulting ester.

EXAMPLE 4

4-bromo-2,5-dimethyl-3-thienylpenicillin

Triethylamine (3.81 gms.) was added to a stirred suspension of 6-aminopenicillanic acid (2.98 gms.) in dry alcohol-free chloroform (21 mls.). The mixture was cooled to 0° and a solution of 4-bromo-2,5-dimethyl-thiophene-3-carbonyl chloride (3.50 gms.) in chloroform (21 mls.) was added dropwise over about ten minutes. The cooling bath was removed and the mixture was stirred for 2½ hours at room temperature, then filtered. The filtrate was washed with 1 N and then with 0.1 N hydrochloric acid (13.8 mls. of each), the washings being discarded. The chloroform layer was shaken vigorously with 1 N aqueous sodium bicarbonate (14 mls.) and the layers were separated by centrifuging. The bicarbonate extract was evaporated at low temperature and pressure to give the crude sodium salt of 4-bromo-2,5-dimethyl-3-thienylpenicillin as a yellow solid (4.07 gms.), estimated by colorimetric assay with hydroxylamine against a benzylpenicillin standard to be about 54% pure.

It inhibited Staph. Oxford at a concentration of 0.6 mc.g/ml., the benzylpenicillin-resistant Staph. 1 62.5 mcg./ml., and the benzylpenicillin-resistant Staph. 2 at 62.5 mcg./ml.

The 4-bromo-2,5-dimethylthiophene-3-carbonyl chloride, b.p. 75–76°/0.05 mm., was prepared by warming the corresponding carboxylic acid with thionyl chloride.

EXAMPLE 5

2-ethyl-3-benzofurylpenicillin (sodium salt)

A solution of crude 2-ethylbenzofuran-3-carbonyl chloride (5 gms.) in acetone (57 mls.) was added, with stirring, to a solution of 6-aminopenicillanic acid (5.19 gms.) in 1 N sodium bicarbonate solution (72 mls.), water (30 mls.) and acetone (143 mls.). After stirring for three hours at room temperature the acetone was distilled off under reduced pressure. The remaining solution was filtered and acidified to pH 2 with 1 N hydrochloric acid (60 mls.) while shaking with ether. The ether layer was washed with a little water, then extracted with suffcient 1 N sodium bicarbonate to bring the pH to 8 (20 mls.). The aqueous extract was then evaporated to dryness at room temperature under reduced pressure. The residual penicillin sodium salt was dried in vacuo to give a pale yellow solid (4.7 gms., 48%).

The product inhibted Staph. Oxford at a concentration of 0.1 mcg./ml.

The 2-ethylbenzofuran-3-carbonyl chloride was obtained by the reaction of oxalyl chloride and 2-ethylbenzofuran in carbon disulphide in presence of aluminum chloride.

EXAMPLE 6

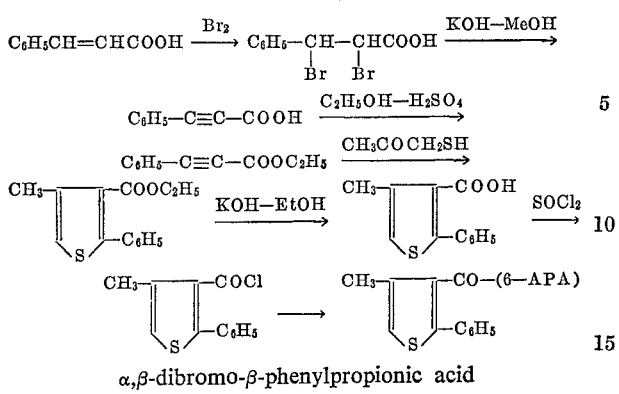

α,β-dibromo-β-phenylpropionic acid

To a solution of 148 g. (1.0 mole) of cinnamic acid in 1 l. of carbon tetrachloride was added 80 g. (1.0 mole) of bromine in 100 ml. of carbon tetrachloride over a period of one hour and the mixture was refluxed for one hour. The reaction mixture being cooled to room temperature, a crystalline precipitate which separated from the mixture was collected by filtration and washed with 100 ml. of cold carbon tetrachloride. It weighed 287 g. (93%). M.P. 201–205° C.

Phenylpropiolic acid

A solution of 100 g. of potassium hydroxide in 400 ml. of methanol was added to 100 g. (0.33 mole) of α,β-dibromophenylpropionic acid under cooling. The resulting mixture was warmed with stirring on a water bath for one hour and then almost all methanol was evaporated in atmospheric pressure with stirring. The residue was dissolved in 400 ml. of methanol and the solution was again evaporated into dryness. This operation was repeated four times and finally the residue was dissolved in 2 l. of water and the aqueous solution was acidified with concentrated hydrochloric acid. The acid solution being allowed to stand at room temperature, the crystalline product deposited. The yield of the oven-dried material was 31.0 g. (65%). M.P. 135–137° C. $\nu_{max}$ 2800–2400, 2260, 1675, 1420, 1310, 920, 755, cm.$^{-1}$.

Ethyl phenylpropiolate

A mixture of 87 g. (0.6 mole) of phenylpropiolic acid, 200 ml. of absolute ethanol and 2 ml. of concentrated sulfuric acid was refluxed for 15 hours. An excess of ethanol was removed and the oily residue was diluted with 300 ml. of water and neutralized with sodium bicarbonate solution. The aqueous solution was extracted with three 100-ml. portions of ether. The ethereal extracts were dried with anhydrous sodium sulfate and the solvent was removed, the residue being distilled in vacuo. B.P. 111.5–115.0° C./3 mm. Yield 69.5 g. (66 5%).

$\nu_{max.}^{liquid}$ 2275, 1710, 1300, 1200 cm.$^{-1}$

Acetonylmercaptane

To 500 ml. of 40% aqueous solution of sodium hydrogensulfide was added 185 g. (2.0 mole) of monochloroacetone under cooling at 0° C. At the end of the addition a white crystalline product appeared. It was collected on a filter and washed with cold water and finally absolute ethanol. Yield 112 g. (62%). M.P. 111–114° C.

$\nu_{max.}^{Nujol}$ 3440 (broad, —OH), 2760 (SH) cm.$^{-1}$

Analysis.—Calcd. for $C_3H_6OS$: C, 40,00; H, 6.71. Found: C, 40.57, 40.97; H, 6.37, 6.70.

Ethyl 3-methyl-5-penylthiophene-4-carboxylate

A mixture of 8.7 g. (0.05 mole) of ethyl phenylpropiolate, 4.5 g. (0.05 mole) of acetonylmercaptane and 4.8 g. (0.05 mole) of sodium tert. butoxide in 100 ml. of benzene was gently refluxed for 16 hours, then cooled to room temperature and poured into dil. sulfuric acid. The acidic solution was extracted with ether and the ethereal solution was washed with water until free from acid, and dried with anhydrous sodium sulfate. After removing the solvent the oily residue which weighed 14 g. was chromatographed on a column of silica gel (Merck, 0.2–0.5 mm.) and eluted with ether-petroleum ether (19:1). The eluate was fractionated into six 200-ml. portions. The first and the second fractions were combined and the solvent was removed. The resulting oily material distilled, B.P. 128–130° C./0.8 mm. Yield 3.41 g. (28%).

$\nu_{max.}^{liquid}$ 1710, 1280, 1160, 1080, cm.$^{-1}$. $\lambda_{max.}^{EtOH}$ 211 m$\mu$ ($\epsilon$ 13,600) 259 m$\mu$ ($\epsilon$ 7,000). 283 m$\mu$ ($\epsilon$ 5,970). $\xi$ (in CCl$_4$, 60 mc.) 8.98 (triplet, 3H), 7.62 (singlet, 3H), 5.89 (quartet, 2H), 3.16 (singlet, 1H), 2.63 (singlet, 5H).

3-methyl-5-phenylthiophene-4-carboxylic acid

Three grams (0.122 mole) of ethyl 3-methyl-5-phenylthiophene-4-carboxylate was dissolved in 5% alcoholic solution of potassium hydroxide. This solution was gently refluxed on a water bath for 6 hours and the solvent was removed in vacuo. The residue was dissolved in 20 ml. of water, treated with active carbon and acidified with dil. hydrochloric acid to give 2.57 g. (99%) of crystalline 3-methyl-5-phenylthiophene-4-carboxylic acid. Recrystallization from ethanol-methanol-water (4:4:1) gave the pure acid melting at 183–184° C.

$\nu_{max}^{Nujol}$ 1668, 1539, 1460, 1290, 945 cm.$^{-1}$. $\lambda_{max}^{EtOH}$ 262 m$\mu$ ($\epsilon$ 8,650), 284.5 m$\mu$ ($\epsilon$ 7,950).

Analysis.—Calcd. for $C_{12}H_{10}O_2S$: C, 66.05; H, 4.62. Found: C, 66.21, 65.86; H, 4.79, 4.73.

3-methyl-5-phenylthiophene-4-carbonyl chloride

A mixture of 1.3 g. (0.006 mole) of 3-methyl-5-phenylthiophene-4-carboxylic acid and 5 ml. of thionyl chloride was refluxed on a water bath for 2 hours, then the excess of thionyl chloride was removed in vacuo. The oily residue was distilled under diminished pressure to give 1.1 g. (78%) of the corresponding acid chloride. B.P. 128–131° C./0.5 mm.

$\nu_{max}^{liquid}$ 1770, 1752 cm.$^{-1}$.

Sodium 6-(3-methyl-5-phenylthiophene-4-carboxamido)penicillanate

A solution of 1.02 g. (0.0047 mole) of 6-APA and 1.01 g. (0.01 mole) of triethylamine in 20 ml. of methylene chloride was stirred for half an hour to obtain a clear solution at room temperature. The 6-APA solution was cooled at 0–5° C. and 1.1 g. (0.0047 mole) of 3-methyl-5-phenylthiophene-4-carbonyl chloride in 10 ml. of methylene chloride was added dropwise to this solution under vigorous stirring. After the addition was completed, stirring was continued at room temperature for 2 hours. The reaction mixture was extracted twice with an equal volume of saturated aqueous solution of sodium bicarbonate. After washing with ether the first extracted solution was covered with 10 ml. of ethyl acetate and acidified with dil. sulfuric acid to pH 3. The ethyl acetate layer was separated and the aqueous layer was again extracted with additional 20 ml. of ethyl acetate. Addition of SEH solution (39%, 4 ml.) to the combined organic solution which was dried with calcium chloride gave the sodium salt of the penicillin as an amorphous precipitate (A, 80 mg.). On standing the filtrate overnight, 500 mg. of the second crop (C) was obtained.

The second aqueous extract was treated as same as that of the first extract to give an additional amount of the penicillin (B, 840 mg.). Total yield 1.42 g. (69%). The IR spectra show that among these three fractions C is highest in the purity.

$\nu_{max}^{Nujol}$ 3475, 1770, 1668, 1620, 1518, 1465, 1410 cm.$^{-1}$. $\lambda_{max}^{H_2O}$ 261 m$\mu$ ($\epsilon$ 6,650), 291 m$\mu$ ($\epsilon$ 5,700).

This penicillin by the tube dilution technique in heart infusion broth exhibited a minimum inhibitory concentration of 0.2–0.4 mcg./ml. vs. the benzylpenicillin-resistant strain of *Staphylococcus aureus* BX–1633–2 and a half-life in aqueous acid at pH 2.0 and 37° C. of 108 minutes.

which did not solidify mainly consisted of 3-chloro-4-methylbenzenesulfonyl chloride. GLC (SE–30, 1.5%; 197° C.; He, 40 ml./min.): retention time, 3, 4 min. for 3,5-dichloro deriv., 2.5 min. for 3-chloro deriv.

EXAMPLE 7

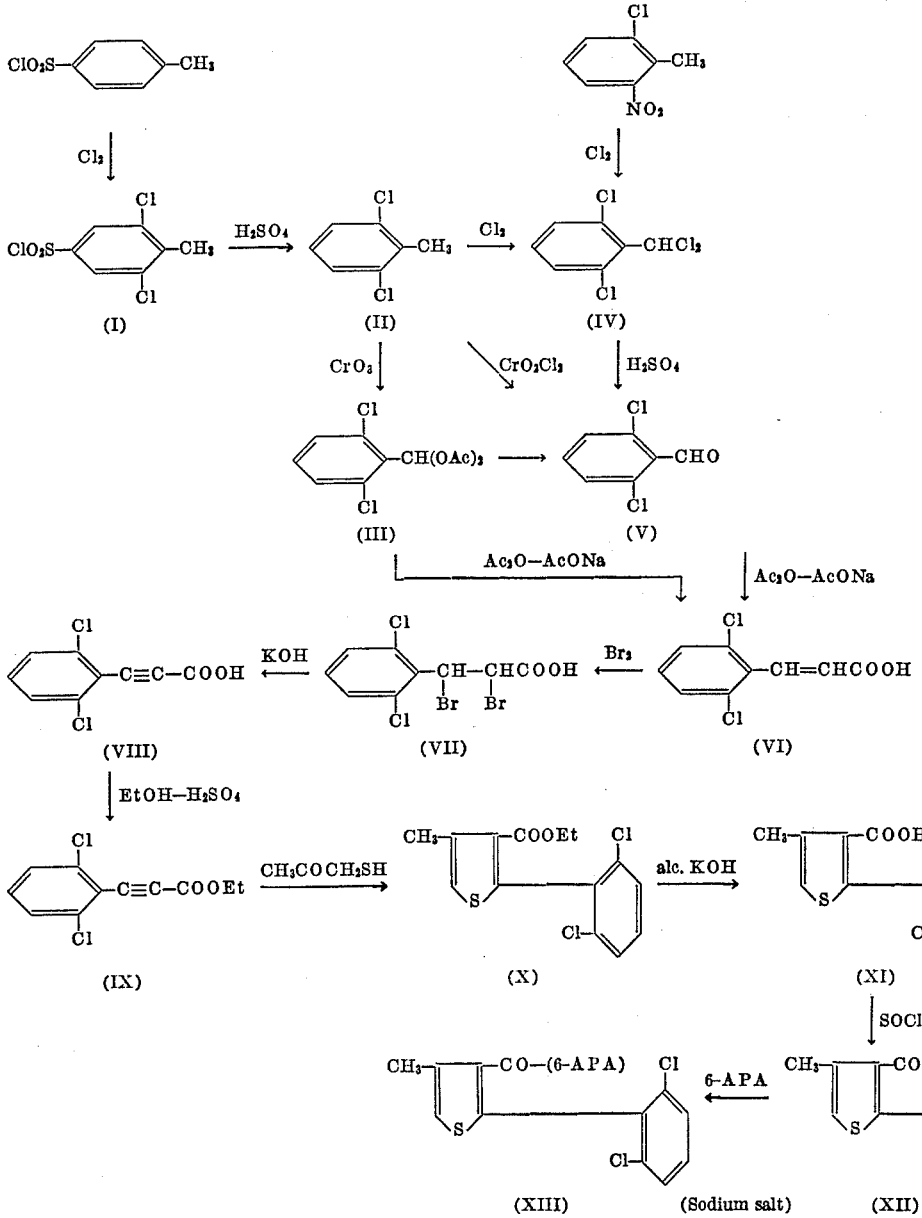

2,6-dichlorotoluene (II)

The preparation of 2,6-dichlorotoluene was followed by the procedure of W. Davis et al., J. Chem. Soc., 119, 853 (1921).

A mixture of 260 g. (1.0 mole) of 3,5-dichloro-4-methylbenzenesulfonyl chloride and 300 ml. of 50% of sulfuric acid was refluxed until the solution became homogeneous. The solution was distilled with superheated steam (200° C.) for 5 hours and the distillate was extracted twice with 100-ml. portions of chloroform. The extracts were washed with water and dried with calcium chloride, the filtrate being evaporated to remove the solvent. Distillation of the residual oil gave 69 g. (43%) of 2,6-dichlorotoluene boiling at 181–205° C.

2,6-dichlorobenzal chloride (III)

The following experiment was carried out according to J. T. Hackmann et al., British Patent 953,554 (Mar. 25, 1954).

Chlorine gas (2.5 kg.) was passed through 1.5 kg. (8.75 moles) of 2-chloro-6-nitrotoluene for 30 hours at

3,5-dichloro-4-methylbenzenesulfonyl chloride (I)

This reaction was carried out according to W. Davis et al., J. Chem. Soc., 119, 853 (1921).

A mixture of 452 g. (2.36 moles) of p-toluenesulfonyl chloride and 30 g. of antimony trichloride was heated until a homogeneous solution was obtained. Chlorine gas was bubbled into the stirred solution for 5 hours at 60–80° C. (increase of weight, 146 g.) The mixture was slowly poured into 1.5 kg. of ice-water and extracted twice with 500-ml. portions of benzene. The benzene extracts were washed with 500 ml. of 5% sodium hydroxide solution and then 500 ml. of water. The extracts being dried with anhydrous calcium chloride, the solvent was removed and the residue distilled in reduced pressure. The distillate boiling at 173–183° C./23 mm. was kept at 0° C. for one day and crystals which separated were collected by filtration and recrystallized from petroleum ether. Yield 89 g. (15%). M.P. 54–59° C. The filtrate (180 g.)

160–180° C., while the water which formed during the reaction was removed. The reaction mixture was dissolved in 1 l. of ether and the solution was washed with 1 l. of water. The solvent being removed, the residue was distilled at 112–114° C. and 6 mm. to afford 860 g. (43%) of 2,6-dichlorobenzal chloride which showed almost one peak of gas chromatography (SH-30, 1.5%; 175° C.; He, 48 ml./min.; retention time, 2.4 min.).

2,6-dichlorobenzaldiacetate (IV)

There was slowly added below 10° C. 85 ml. (1.5 moles) of concentrated sulfuric acid to a stirred mixture of 58 g. (0.36 mole) of 2,6-dichlorotoluene, 570 ml. (600 g.) of glacial acetic acid and 565 ml. (612 g., 6 moles) of acetic anhydride. The mixture was cooled to 5° C. and 100 g. (1 mole) of chromium trioxide was added in small portions at such a rate that the temperature did not rise above 10° C. When the addition was completed, stirring was continued for ten minutes. The reaction mixture was poured into ice-water and the oily product separated was extracted four times with 1 l. of chloroform. The anhydrous sodium sulfate, and the solvent was evaporated. The residue was distilled under reduced pressure to afford 40 g. (40%) of 2,6-dichlorobenzaldiacetate boiling at 100–140° C./2 mm. $\nu_{C=O}$ 1765 cm.$^{-1}$.

2,6-dichlorobenzaldehyde (V)

Four different procedures were adopted for the preparation of 2,6-dichlorobenzaldehyde as described below. All the products were identified by the IR spectra and the mixed melting point.

(a) From 2,6-dichlorobenzal chloride.—This procedure has been reported by G. Stork and W. N. White in J. Am. Chem. Soc., 78, 4609 (1951).

To 1140 ml. of concentrated sulfuric acid which was warmed at 60–70° C. was added dropwise 860 g. (3.74 moles) of 2,6-dichlorobenzal chloride over a period of 2.5 hours with stirring. Stirring was continued at the same temperature for additional 2 hours and the mixture was poured into 5 kg. of ice-water. The precipitate which formed was collected by filtration, washed with saturated sodium bicarbonate solution and then with water. Yield 636 g. (97%). An analytical sample was recrystallized from ligroin. M.P. 71° C. $\nu_{C=O}$ 1690 cm.$^{-1}$. $\lambda_{max}$ 250.5 m$\mu$ ($\epsilon$ 5,700), 257 (sh.) m$\mu$ ($\epsilon$ 4,810), 306 m$\mu$ ($\epsilon$ 1,430). GLC (SE-30, 1.5%; 174° C.; He, 48 ml./min.):retention time, 1.7 min.

*Analysis.*—Calcd. for $C_7H_4Cl_2O$: C, 48.04; H, 2.30. Found: C, 47.93, 48.17; H, 2.05, 1.97.

(b) From 2,6-dichlorotoluene via 2,6-dichlorobenzal chloride.—Chlorine gas was passed into 765 g. (4.75 moles) of 2,6-dichlorotoluene through a sintered glass bubbler under irradiation of an unfrosted 300 w. lamp at 160–180° C. for about 4 hours until the reaction mixture gained its weight by 275 g. (83% of the calculated amount). The crude 2,6-dichlorbenzal chloride which was 61% purity by gas chromatography was added over a period of 1.5 hours to 1.5 l. of concentrated sulfuric acid at 90–100° C. under vigorous stirring. During this period hydrogen chloride gas evolved vigorously. After the addition was completed, the mixture was kept at the same temperature for half an hour and then chilled to 0–5° C. to separate products such as 1,2,3-trichlorobenzene (M.P. 53–54° C.)

*Analysis.*—Calcd. for $C_6H_3Cl_3$: C, 41.78; H, 1.75. Found: C, 41.34, 41.24; H, 2.21, 1.49 and 2,3,6-trichlorobenzal chloride (M.P. 71–72° C.)

*Analysis.*—Calcd. for $C_7H_3Cl_5$: C, 31.80; H, 1.14. Found: C, 31.81, 32.18; H, 11.28, 1.23 which were removed by decantation. The supernatant was poured into crushed ice to precipitate with water, dil. sodium bicarbonate solution and finally water. Recrystallization from ligroin gave 260 g. (overall 31%) of 2,6-dichlorobenzaldehyde melting at 67–70° C.

(c) Oxidation of 2,6-dichlorotoluene by chromyl chloride.—Preparation of chromyl chloride.—To a solution of 150 g. (1.5 moles) of chromium oxide in 100 ml. of water was added 330 ml. of concentrated hydrochloric acid at 0° C. While the solution was stirred, 450 ml. of concentrated sulfuric acid was added dropwise from a dropping funnel. Occasionally ice was added to the reaction mixture in order to keep the temperature below 20° C. When all the sulfuric acid had been added, the reaction mixture was transferred to a separatory funnel and the lower layer of chromyl chloride which separated was distilled. B.P. 116–116° C. Yield 151 g. (65%). Oxidation.—A solution of 2,6-dichlorotoluene (38 g., 0.236 mole) in 250 ml. of carbon disulfide was added over a period of 30 minutes to a stirred solution of 70 g. (0.45 mole) of chromyl chloride in 150 ml. of the same solvent. After standing for 96 hours at room temperature the dark colored crystalline intermediate was collected by filtration and washed with carbon disulfide. The solid being treated with water, the resulting oily product was extracted with four 100-ml. portions of chloroform and the combined chloroform extracts were washed with saturated sodium bicarbonate solution ad water. After removal of the solvent the resulting residue was distilled under reduced pressure to give 4.0 g. (9.5%) of 2,6-dichlorobenzaldehyde boiling at 83–85° C./1-2 mm., which solidified slowly.

(d) From 2,6-dichlorobenzaldiacetate there was added 40 g. (0.145 mole) of 2,6-dichlorobenzaldiacetate to a mixture of 100 ml. of water, 100 ml. of alcohol and 10 ml. of conentrated sulfuric acid and the mixture was refluxed for thirty minutes. The insoluble material being filtered off, the filtrate was chilled in ice-water and extracted with three 100-ml. portions of chloroform. The combined chloroform extracts were washed with 100 ml. of saturated aqueous sodium bicarbonate solution, then three 100-ml. portions of water and dried with anhydrous sodium sulfate. The solvent was removed and the residue was distilled under diminished pressure to give 21 g. (83%) of 2,6-dichlorobenzaldehyde which was crystallized from ligroin. M.P. 171° C.

2,6-dichlorocinnamic acid (VI)

(a) A mixture of 260 g. (1.49 moles) of 2,6-dichlorobenzaldehyde, 300 g. (3.0 moles) of acetic anhydride, 123 g. (1.49 moles) of sodium acetate was heated at 180° C. on an oil-bath for 7 hours. The mixture was cooled to room temperature and poured into cold water, the resulting precipitates being collected on a filter. The acid thus obtained was dissolved in 5% sodium carbonate solution, treated with active carbon and filtered. The filtrate being acidified with dil. hydrochloric acid, the precipitated acid was filtered by suction and washed with water. Recrystallization from ethanol-water gave 300 g. (92%) of 2,6-dichlorocinnamic acid. M.P. 193–194° C.

$\lambda_{max}^{EtOH}$ 221 m$\mu$ ($\epsilon$ 22,000), 265 m$\mu$ ($\epsilon$ 10,800). $\nu_{C=O}$ 1685 cm.$^1$

*Analysis.*—Calcd. for $C_9H_6Cl_2O_2$: C, 49.80; H, 2.79. Found: C, 50.05, 49.90; H, 2.88, 2.91.

(b) A mixture of 177 g. (0.64 mole) of 2,6-dichlorobenzaldiacetate, 128 g. (1.28 moles) of acetic anhydride, 52.5 g. (0.64 mole) of sodium acetate was gently refluxed at 190–200° C. on an oil-bath for 14 hours. After cooling to room temperature the mixture was diluted with water and the resulting product was collected by filtration. The product was dissolved in an alkaline solution, treated with active carbon and filtered. The filtrate was acidified with dil. hydrochloric acid and the precipitate was filtered by suction, washed with water. Recrystallization from ethanol-water gave 69 g. (50%) of 2,6-dichlorocinnamic acid. M.P. 193–194° C.

α,β-dibromo-β-(2,6-dichlorophenyl)propionic acid (VII)

(a) To a suspended solution of 26 g. (0.12 mole) of 2,6-dichlorocinnamic acid in 300 ml. of carbon tetrachloride was added 20 g. (0.125 mole) of bromine in 50 ml. of carbon tetrachloride over a period of half an hour at room temperature, then refluxed for one hour with stirring. The reaction mixture was evaporated into dryness and the resulting residue was recrystallized from ligroin to give 28.5 g. (76%) of the product. M.P. 193–194° C. $\nu_{C=O}$ 1720 cm.$^{-1}$.

(b) To a solution of 184 g. (0.85 mole) of 2,6-dichlorocinnamic acid in 400 ml. of glacial acetic acid was added dropwise, 146 g. (0.91 mole) of bromine and the mixture was kept to stand at room temperature for 48 hours. The reaction mixture was poured into 3 l. of water and the resulting product was collected by filtration. Recrystallization from ligroin gave 154 g. (67%) of the product.

2,6-dichlorophenylpropiolic acid (VIII)

To 100 g. (0.27 mole) of α,β-dibromo-β-(2,6-dichlorophenyl)propionic acid was added a solution of 61.6 g. (1.1 moles) of potassium hydroxide in 350 ml. of 85% ethanol under cooling, then the mixture was refluxed for 3 hours. At the end of the period almost all ethanol was distilled off at atmospheric pressure with stirring and the resulting residue was dissolved in 2 l. of water, the aqueous solution being treated with active carbon and acidified with conc. hydrochloric acid under cooling. The precipitate which separated was filtered and washed with water to give 47.0 g. (82%) of 2,6-dichlorophenylpropiolic acid. M.P. 167° C. $\nu_{C\equiv C}$ 2260 cm.$^{-1}$. $\nu_{C=O}$ 1675 cm.$^{-1}$.

Ethyl 2,6-dichlorophenylpropiolate (IX)

A mixture of 130 g. (0.6 mole) of 2,6-dichlorophenylpropiolic acid, 5 ml. of sulfuric acid in 1 l. of dry ethanol was refluxed for 6 hours. The excess of ethanol was removed by distillation under reduced pressure and the residue was poured into 2 l. of water. The resulting precipitates were collected by filtration and washed with aqueous sodium bicarbonate, then water. Recrystallization from ethanol-water give 87 g. (60%) of the ester. M.P. 51–52° C. $\nu_{C\equiv C}$ 2250 cm.$^{-1}$. $\nu_{C=O}$ 1703 cm.$^{-1}$.

Ethyl 2-(2,6-dichlorophenyl)-4-methylthiophene-3-carboxylate (X)

A mixture of 24 g. (0.1 mole) of ethyl 2,6-dichlorophenylpropiolate, 9 g. (0.1 mole) of acetonylmercaptane, 9.6 g. (0.1 mole) of sodium tert-butoxide in 120 ml. of benzene was gently refluxed for 4 hours with stirring. The reaction mixture was poured into dil. hydrochloric acid and extracted with three 100-ml. portions of benzene. The combined extracts were washed with water and the solvent was evaporated off. Distillation of the oily residue under reduced pressure gave 14.5 g. (46%) of the product. B.P. 135–145° C./0.6 mm. $\nu_{C=O}$ 1705 cm.$^{-1}$.

$\lambda_{max.}^{EtOH}$ 215 mμ (ε 19,400), 265 mμ (ε 8,600)

2-(2,6-dichlorophenyl)-4-methylthiophene-3-carboxylic acid (XI)

A mixture of 14 g. (0.045 mole) of ethyl 2-(2,6-dichlorophenyl)-4-methylthiophene-3-carboxylate, 3 g. (0.054 mole) of potassium hydroxide in 60 ml. of ethanol was refluxed for 5 hours on a steam-bath. The solvent was removed in vacuo and the residue was dissolved in 150 ml. of water. The solution was treated with active carbon and the filtrate was acidified with diluted hydrochloric acid to afford the thiophene acid which was recrystallized from ethanol-water. Yield 8 g. (61%). M.P. 181–182° C. $\nu_{max}$ 3200–2280, 1685 cm.$^{-1}$.

$\lambda_{max.}^{EtOH}$ 221 mμ (ε 39,900), 264 mμ (ε 14,300)

*Analysis.*—Calcd. for $C_{12}H_8Cl_2O_2S$: C, 50.19; H, 2.81. Found: C, 49.74; H, 2.97.

2-(2,6-dichlorophenyl)-4-methylthiophene-3-carbonyl chloride (XII)

2-(2,6 - dichlorophenyl)-4-methylthiophene - 3 - carboxylic acid (20 g., 0.07 mole) and 60 ml. of thionyl chloride were washed for 4 hours on a steam bath. An excess of thionyl chloride was distilled off at reduced pressure. Distillation of the resulting residue gave 14 g. (66%) of the acid chloride, B.P. 130–151° C./0.5 mm. $\nu_{C=O}$ 1745 cm.$^{-1}$.

Sodium 6-[2-(2',6'-dichlorophenyl)-4-methylthiophene-3-carboxamido]penicillanate (XIII)

A solution of 14 g. (0.046 mole) of the acid chloride in 100 ml. of methylene chloride was added over a period of 30 minutes to a rapidly stirred mixture of 10 g. (0.046 mole) of 6-APA and 14 g. (0.14 mole) of triethylamine in 300 ml. of methylene chloride, the temperature being maintained at 5–10° C. The mixture was stirred for 2 hours at room temperature. The reaction mixture was extracted with 100-ml. portions of 5% sodium bicarbonate solution, the four 100-ml. portions of water. The combined extracts were washed with 200 ml. of ether, then layered with 200 ml. of ethyl acetate and acidified with dil. sulfuric acid under vigorous agitation in the cold. After separation of the phases the aqueous one was extracted three times with 100 ml. of ethyl acetate. The ethyl acetate layer was combined with the ethyl acetate extracts, washed with 150 ml. of water and dried with anhydrous sodium sulfate, then calcium chloride. To the filtrate was added 20 ml. of 39% SEH solution and the mixture was concentrated to one third of the volume. To the concentrate was added 500 ml. of n-hexane to give 19 g. (81%) of the penicillin. M.P. 179–180° C. $\nu_{max}$ 1770, 1650, 1605, 1500, 1403 cm.$^{-1}$.

$\lambda_{max}^{H_2O}$ 256 mμ (ε 8,000).

*Analysis.*—Calcd. for $C_{20}H_{17}Cl_2N_2O_4S_2Na\cdot H_2O$: C, 45.72; H, 3.65; N, 5.33. Found: C, 45.67, 45.29; H, 4.03, 4.15; N, 5.34, 5.36.

Fifteen grams of the penicillin was dissolved in 500 ml. of benzene and the solution was treated with active carbon. To the filtrate was added 500 ml. of n-hexane to reprecipitate 11 g. of the penicillin. M.P. 180–181° C. The reprecipitation showed an improvement in the color, but the purity estimated by IR fell down slightly.

This penicillin by the tube-dilution technique in heart infusion broth exhibited a minimum inhibitory concentration of 0.4 mcg./ml. vs. the benzylpenicillin-resistant strain of *Staphylococcus aureus* BX-1633-2 and had a half-life in aqueous acid at pH 2.0 and 37° C. of 15–30 minutes.

EXAMPLE 8

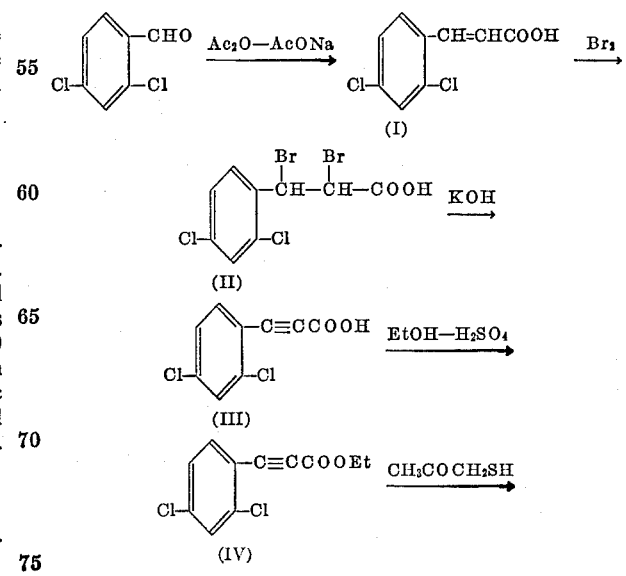

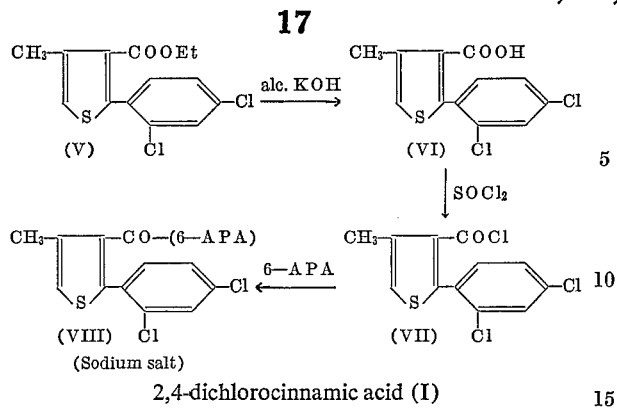

(Sodium salt)

2,4-dichlorocinnamic acid (I)

A mixture of 100 g. (0.57 mole) of 2,4-dichlorobenzaldehyde, 102 g. (1.0 mole) of acetic anhydride, 47 g. (0.57 mole) of sodium acetate was heated at 180–190° C. on an oil bath for 7 hours. The mixture was cooled to room temperature. The solid which separated was added to 33% sodium hydroxide solution. But it did not dissolve completely in the alkaline solution, so the suspension was acidified with dil. hydrochloric acid and the precipitate was filtered by suction and washed with water. Recrystallization from ethanol gave 114 g. (92%) of 2,4-dichlorocinnamic acid. M.P. 232–233° C.

$\lambda_{max}^{EtOH}$ 278 m$\mu$ ($\epsilon$ 21,000), 234 m$\mu$ ($\epsilon$ 12,000), 227 m$\mu$ ($\epsilon$ 15,300). $\nu_{C=O}$ 1675 cm.$^{-1}$.

$\alpha,\beta$-dibromo-$\beta$-(2,4-dichlorophenyl)-propionic acid (II)

To a suspension of 114 g. (0.52 mole) of 2,4-dichlorocinnamic acid in 520 ml. of carbon tetrachloride was added 120 g. (0.75 mole) of bromine in 300 ml. of carbon tetrachloride over a period of 2 hours at 90° C. on an oil bath. After the addition was completed, reflux was continued for one hour with stirring. The reaction mixture was evaporated into dryness and the resulting residue was washed with water to give 151.5 g. (77%) of the product. M.P. 181.5–182.5° C.

$\lambda_{max}^{EtOH}$ 241 m$\mu$ ($\epsilon$ 8,800). $\nu_{C=O}$ 1705 cm.$^{-1}$.

2,4-dichlorophenylpropiolic acid (III)

To 138 g. (0.366 mole) of $\alpha,\beta$-dibromo-$\beta$-(2,4-dichlorophenyl)propionic acid in 450 ml. of ethanol was added a solution of 95.2 g (1.68 moles) of potassium hydroxide in 70 ml. of water under cooling and the mixture was refluxed for 2 hours. The ethanol was distilled off at atmospheric pressure with stirring and the residue was dissolved in 6 l. of water, the aqueous solution being treated with active carbon and acidified with conc. hydrochloric acid. The precipitate was filtered and washed with water to give 66 g. (84%) of 2,4-dichlorophenylpropiolic acid. M.P. 165–167° C.

$\lambda_{max}^{EtOH}$ 260 m$\mu$ ($\epsilon$ 16,200). $\nu_{C\equiv C}$ 2260 cm.$^{-1}$, $\nu_{C=O}$ 1720 cm.$^{-1}$

*Analysis.*—Calcd. for $C_9H_4Cl_2O_2$: C, 50.27; H, 1.88; Cl, 32.98. Found: C, 50.01, 50.42; H, 2.10, 2.14; Cl, 32.86, 32.94.

Ethyl 2,4-dichlorophenylpropiolate (IV)

A mixture of 66 g. (0.30 mole) of 2,4-dichlorophenylpropiolic acid, 10 ml. of conc. sulfuric acid in 150 ml. of dry ethanol was refluxed for 3 hours. An excess of the ethanol was removed by distillation under reduced pressure and the residue was poured into 1 l. of water. The resulting precipitate were collected by filtration and washed with aqueous sodium bicarbonate, then water. The propiolate weighed 34 g. (45.6%). M.P. 30–35° C.

$\nu_{C\equiv C}$ 2260 cm.$^{-1}$, $\nu_{C=O}$ 1705 cm.$^{-1}$

Ethyl 2-(2,4-dichlorophenyl)-4-methylthiophene-3-carboxylate (V)

A mixture of 20 g. (0.082 mole) of ethyl 2,4-dichlorophenylpropiolate, 7.9 g. (0.082 mole) of sodium tert. butoxide, 7.1 g. (0.082 mole) of acetonyl mercaptane in 40 ml. of benzene was refluxed for 5 hours with stirring. The reaction mixture was poured into dil. hydrochloric acid and extracted with three 50-ml. portions of benzene. The combined extracts were washed with water and the solvent was evaporated off. Distillation of the oily residue under reduced pressure gave 17 g. (65.8%) of the thiophene ester. B.P. 150–178° C./0.6–0.7 mm., $\nu_{C=O}$ 1703 cm.$^{-1}$.

2-(2,4-dichlorophenyl)-4-methylthiophene-3-carboxylic acid (VI)

A mixture of 17 g. (0.054 mole) of ethyl (2,4-dichlorophenyl)-4-methylthiophene-3-carboxylate and 3.5 g. of potassium hydroxide in 90 ml. of ethanol was refluxed for 5 hours on a water bath. The solvent was removed in vacuo and the residue was dissolved in 250 ml. of water. The solution was treated three times with active carbon and the filtrate was acidified with dil. hydrochloric acid to afford the thiophene acid, which was recrystallized from ethanol-water. Yield 2.24 g. (14.5%). M.P. 189–193° C.

$\lambda_{max}^{EtOH}$ 253 m$\mu$ ($\epsilon$ 8,900). $\nu_{C=O}$ 1666 cm.$^{-1}$

*Analysis.*—Calcd. for $C_{12}H_8Cl_2O_2S$: C, 50.18; H, 2.81; Cl, 24.69. Found: C, 50.12, 49.50; H, 2.99, 3.10; Cl, 25.80, 25.73.

2-(2,4-dichlorophenyl)-4-methylthiophene-3-carbonyl chloride (VII)

A mixture of 1.345 g. (0.0047 mole) of 2-(2,4-dichlorophenyl)-4-methylthiophene-3-carboxylic acid and 4.5 ml. of thionyl chloride was refluxed for 2 hours on a water bath. An excess of thionyl chloride was removed at reduced pressure and the residue was distilled to give 1.030 g. (72%) of the acid chloride boiling at 96–105° C./1.2–1.3 mm. $\nu_{C=O}$ 1748 cm.$^{-1}$.

Sodium 6-[2-(2',4'-dichlorophenyl)-4-methylthiophene-3-carboxamido]penicillanate (VIII)

A solution of 1.03 g. (0.0034 mole) of the thiophene acid chloride in 20 ml. of acetone was added over a period of 20 minutes to a vigorously stirred mixture of 0.74 g. (0.0034 mole) of 6-APA and 0.86 g. (0.0102 mole) of sodium bicarbonate in 20 ml. of water, the temperature being maintained at 5–10° C. The mixture was stirred for half an hour at room temperature. After the reaction mixture was washed with ether, the aqueous phase was layered with 50 ml. of ethyl acetate and acidified with dil. sulfuric acid under vigorous agitation. After separation of the phases, the aqueous phase was extracted three times with 50 ml. of ethyl acetate. The ethyl acetate layer was combined with ethyl acetate extracts, washed with 50 ml. of water and dried with anhydrous sodium sulfate, then calcium chloride. To the filtrate was added 1.3 ml. of 39% SEH solution, and the mixture was concentrated to one fourth of the volume. To the concentrate was added 20 ml. of n-hexane to give 0.715 g. (43.4%) of the penicillin. M.P. 220° C. (dec.).

$\lambda_{max}^{H_2O}$ 260 m$\mu$ ($\epsilon$ 7,150). $\nu_{max}$ 1765, 1652, 1602, 1492, 1396 cm.$^{-1}$

*Analysis.*—Calcd. for $C_{20}H_{17}Cl_2N_2O_4S_2Na$: C, 47.34; H, 3.38; N, 5.52. Found: C, 47.28, 47.52; H, 4.51, 4.69; N, 5.40, 5.45.

This penicillin by the tube dilution technique in heart infusion broth exhibited a minimum inhibitory concentration of 0.2 mcg./ml. vs. the benzylpenicillin-resistant strain of *Staphylococcus aureux* BX–1633–2 and had a half-life in aqueous acid at pH 2.0 and 37° C. of ca. 42 minutes.

EXAMPLE 9

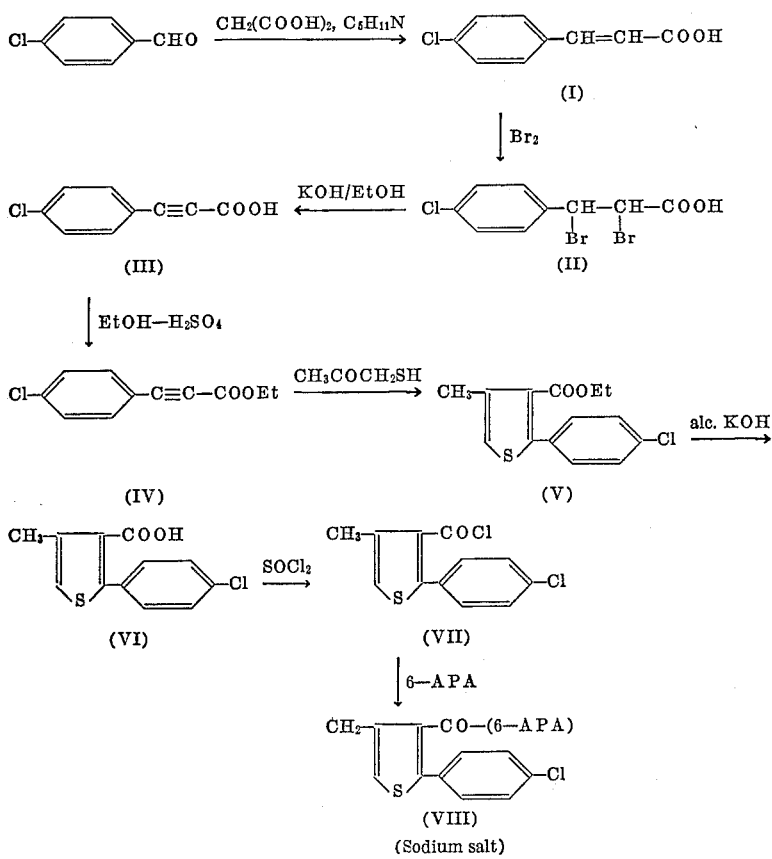

p-Chlorocinnamic acid (I)

p-Chlorocinnamic acid was prepared from a commercial p-chlorobenzaldehyde by the Knoevenagel condensation. To a warmed solution of 93.0 g. (0.63 mole) of p-chlorobenzaldehyde, 136 g. (1.28 moles) of malonic acid and 255 ml. of pyridine was added 9.5 ml. of piperidine and the mixture was heated at 80–85° C. for 1.5 hours on an oil bath and then refluxed at 110–115° C. for 5 hours. The resulting mixture was cooled to room temperature and poured into 2.5 l. of cold water. The aqueous solution was acidified to pH 2.0 with conc. hydrochloric acid to give a white precipitate. The crude acid was dissolved in 2% aqueous sodium hydroxide solution, and treated with active carbon. The filtrate was acidified with dil. hydrochloric acid (1:1) to give 114 g. (98.5%) of pure p-chlorocinnamic acid. M.P. 252–254° C. (in a sealed tube). $\nu_{C=O}$ 1680 cm.$^{-1}$, $\nu_{C=O}$ 1620 cm.$^{-1}$.

α,β-Dibromo-β-(p-chlorophenyl)propionic acid (II)

To a stirred suspension of 114.0 g. (0.62 mole) of p-chlorocinnamic acid in 650 ml. of carbon tetrachloride was added 128 g. (0.8 mole) of bromine in 80 ml. of carbon tetrachloride over a period of half an hour at room temperature, and the mixture was refluxed for 5 hours with stirring. The reaction mixture was evaporated into dryness and the residue was washed with cold carbon tetrachloride to give 205 g. (76.0%) of the dibromo acid, M.P. 185–187° C. $\nu_{C=O}$ 1720 cm.$^{-1}$.

p-Chlorophenylpropiolic acid (III)

To a solution of 102.5 g. (0.3 mole) of α,β-dibromo-β-(p-chlorophenyl)propionic acid and 360 ml. of ethanol was added a cold solution of 70.0 g. (1.25 moles) of potassium hydroxide in 60 ml. of water at room temperature and the mixture was refluxed for 2 hours with stirring. At the end of the period, the solvent was entirely distilled off at atmospheric pressure with stirring and the residue dissolved in 1.2 l. of water, the aqueous solution being treated with active carbon and acidified with conc. hydrochloric acid under cooling. The white precipitate which separated was filtered and washed with water to give 52.0 g. (96.3%) of p-chlorophenylpropiolic acid. M.P. 183–185° C.

$\nu_{C\equiv C}$ 2250 cm.$^{-1}$, $\nu_{C=O}$ 1680 cm.$^{-1}$.

Ethyl p-chlorophenylpropiolate (IV)

To a solution of 94.0 g. (0.51 mole) of p-chlorophenylpropiolic acid in 350 ml. of absolute ethanol was slowly added 15 ml. of conc. sulfuric acid under cooling and the mixture was refluxed for 5 hours. An excess of the ethanol was removed by distillation under reduced pressure and the residue was poured into 1.5 l. of ice-water. The resulting mixture was neutralized with aqueous sodium bicarbonate solution and extracted with three 150-ml. portions of ether. The combined extracts were washed with water and dried with anhydrous calcium chloride. The solvent was evaporated off and the oily residue was distilled under reduced pressure to give 61.0 g. (57.5%) of ethyl p-chlorophenylpropiolate. B.P. 123–125° C./0.25 mm. $\nu_{C=O}$ 1700 cm.$^1$.

Ethyl 2-(p-chlorophenyl)-4-methylthiophene-3-carboxylate (V)

A mixture of 20.9 g. (0.1 mole) of ethyl p-chlorophenylpropiolate, 9 g. (0.1 mole) of acetonyl mercaptane and 9.6 g. (0.1 mole) of sodium tert. butoxide in 200 ml. of dry benzene was gently refluxed for 4 hours with stirring. The reaction mixture was poured into dil. sulfuric acid and extracted with three 100-ml. portions of benzene. The combined extracts were washed with water and the solvent was removed. Distillation of the oily residue under reduced pressure gave 13.7 g. (48.8%) of the thiophene ester. B.P. 156–166° C./1.2–1.3 mm. $\nu_{C=O}$ 1705 cm.$^{-1}$.

2-(p-chlorophenyl)-4-methylthiophene-3-carboxylic acid (VI)

A mixture of 13.7 g. (0.049 mole) of ethyl 2-(p-chlorophenyl)-4-methylthiophene-3-carboxylate and 4.1 g. (0.073 mole) of potassium hydroxide in 80 ml. of ethanol was refluxed for 5 hours. The solvent was removed in vacuo and the residue was dissolved in 150 ml. of water. The solution was treated with active carbon and the filtrate was acidified with dil. hydrochloric acid to give the thiophene acid, which was recrystallized from ethanol-water. Yield 5.4 g. (43.1%) M.P. 154–155° C. $\nu_{C=O}$ 1665 cm.$^{-1}$.

$\lambda_{max}^{EtOH}$ (in m$\mu$) 218 ($\epsilon$15,500), 224 (sh.) ($\epsilon$13,500), 281 ($\epsilon$14,300), 292 (sh.) ($\epsilon$12,500), 302 (sh.) ($\epsilon$9,150).

Analysis.—Calcd. for $C_{12}H_9ClO_2S$: C, 57.03; H, 3.59; Cl, 14.03; S, 12.69. Found: C, 57.06, 57.04; H, 4.11, 3.81; Cl, 14.71, 15.33; S, 11.43, 11.13.

2-(p-chlorophenyl)-4-methylthiophene-3-carbonyl chloride (VII)

A mixture of 2.0 g. (0.0079 mole) of 2-(p-chlorophenyl)-4-methylthiophene-3-carboxylic acid and 9.5 g. (0.08 mole) of thionyl chloride was refluxed for 2 hours. An excess of the thionyl chloride was removed at reduced pressure. Distillation of the resulting residue gave 1.5 g. (70%) of the acid chloride. B.P. 120–128° C./0.2 mm. $\nu_{C=O}$ 1755 cm.$^{-1}$.

Sodium 6-[2-(p-chlorophenyl)-4-methylthiophene-3-carboxamido]-penicillanate (VIII)

A solution of 1.5 g. (0.0055 mole) of 2-(p-chlorophenyl)-4-methylthiophene-3-carbonyl chloride in 1.8 ml. of absolute acetone was added at 0° C. over a period of 15 minutes to a rapidly stirred mixture of 1.4 g. (0.0165 mole) of sodium bicarbonate, 3.19 g. (0.005 mole) of 6-APA, 8.1 ml. of water and 6.3 ml. of absolute acetone. The mixture was stirred for 45 minutes at 10–15° C. The reaction mixture was washed with two 100-ml. portions of ether. The aqueous phase was covered with 50 ml. of ethyl acetate and acidified with 10% sulfuric acid under stirring. The aqueous layer was subjected to further extractions with four 50-ml. portions of ethyl acetate. The combined ethyl acetate extracts were washed with 200 ml. of water and dried with anhydrous sodium sulfate, then with anhydrous calcium chloride. To the filtrate was added 3 ml. of 35% SEH (sodium 2-ethylhexanoate in dry butanol) solution, and the mixture was concentrated to one third of the volume at 30–35° C. To the concentrate was added 200 ml. of n-hexane to give 1.52 g. (58.6%) of sodium 6-[2-(p-chlorophenyl)-4-methylthiophene-3-carboxamido]-penicillanate. The penicillin (sodium salt) melted at 188–190° C. and decomposed at 193–195° C. with gas evolution. $\nu_{max}$ 1765, 1655, 1605, 1500, 1405 cm.$^{-1}$.

$\lambda_{max}^{H_2O}$ 220 m$\mu$ (sh.) ($\epsilon$14,900), 226 m$\mu$ (sh.) ($\epsilon$12,900) 287.5 m$\mu$ ($\epsilon$13,900). Purity by IR.:76.3%.

Analysis.—Calcd. for $C_{20}H_{18}ClN_2O_4S_2Na \cdot H_2O$: C, 48.92; H, 4.11; N, 5.71; Cl, 7.22. Found: C, 49.08, 49.44; H, 4.67, 4.56; N, 5.99, 6.04; Cl, 7.00, 7.50.

This penicillin by the tube dilution technique in heart infusion broth exhibited a minimum inhibitory concentration of 0.4–0.8 mcg./ml. vs. the benzylpenicillin-resistant strain of Staphylococcus aureus BX–1633–2 and had a half-life in aqueous acid at pH 2.0 and 37° C. of ca. 42 minutes.

EXAMPLE 10

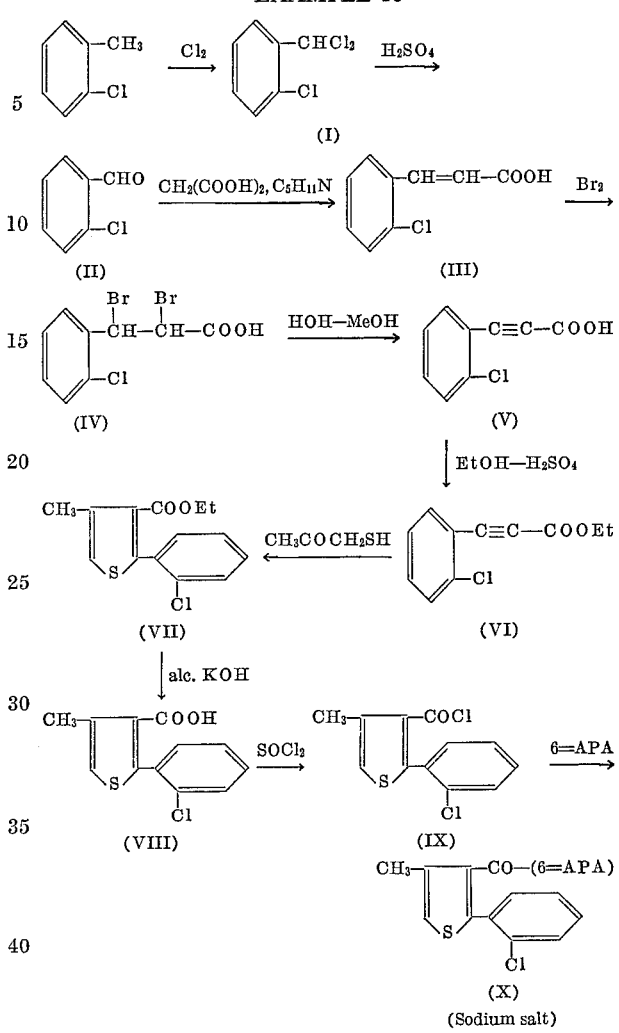

(Sodium salt)

o-Chlorobenzal chloride (I)

Chlorine gas (1.55 kg.) was passed through a mixture of 541 g. (4.26 moles) of o-chlorotoluene and 16.4 g. of phosphorus pentachloride under irradiation of a 300 w. lamp for 12 hours at 160–170° C. The reaction mixture was distilled under reduced pressure to give 288.5 g. (34.7%) of o-chlorobenzal chloride. B.P. 113° C./21–22 mm. $\nu_{max}$ 1440, 1215, 1050, 840, 750, 740 cm.$^{-1}$.

o-Chlorobenzaldehyde (II)

Preparation of o-chlorobenzaldehyde was carried out according to the procedure of G. Stark & W. N. White, J. Am. Chem. Soc., 78, 4609 (1951) for 2,6-dichlorobenzaldehyde. To 510 ml. of conc. sulfuric acid which was warmed at 60–70° C. was added dropwise 288 g. (1.47 moles) of o-chlorobenzal chloride over a period of 5 hours with stirring. Stirring was continued at the same temperature for additional one hour and the mixture was poured into 2 l. of ice-water. The yellow solid which formed was extracted with five 200-ml. portions of ether and the ethereal solution was washed with 2% aqueous sodium hydroxide solution, then water and dried with anhydrous sodium sulfate. The filtrate was distilled under reduced pressure to give 30.0 g. (14.5%) of o-chlorobenzaldehyde. B.P. 97–98° C./20–21 mm. $\nu_{max}$ 1685, 760 cm.$^{-1}$.

$\lambda_{max}^{EtOH}$ 248 m$\mu$ ($\epsilon$5,950), 295 m$\mu$ ($\epsilon$1,070)

o-Chlorocinnamic acid (III)

The preparation of o-chlorocinnamic acid was carried out by the Knoevenagel condensation. A mixture of 11.0 g. (0.078 mole) of o-chlorobenzaldehyde, 16.4 g. (0.156 mole) of malonic acid and 31 ml. of pyridine was warmed on a water bath to give a clear solution. To the solution was added 1.2 ml. of piperidine at the same temperature. The mixture was heated at 80–85° C. for 1.5 hours on an oil bath and refluxed at 110–115° C. for 5 hours. The reaction mixture was cooled to room temperature and poured into 32 ml. of cold water. The aqueous solution was acidified to pH 2.0 with conc. hydrochloric acid to give a white precipitate, which was dissolved in 2% aqueous sodium hydroxide solution and treated with active carbon. The filtrate was acidified with dil. hydrochloric acid (1:1) to give 11.4 g. (79%) of o-chlorocinnamic acid. M.P. 219–221° C. (in a sealed tube). $\nu_{C=O}$ 1680 cm.$^{-1}$, $\nu_{C=C}$ 1620 cm.$^{-1}$.

α,β-Dibromo-β-(o-chlorophenyl)propionic acid (IV)

To a suspension of 30.0 g. (0.164 mole) of o-chlorocinnamic acid in 200 ml. of carbon tetrachloride was added 32 g. (0.2 mole) of bromine in 20 ml. of carbon tetrachloride over a period of an hour at room temperature and the mixture was refluxed for 4 hours with stirring. The reaction mixture was evaporated into dryness and the residue washed with cold carbon tetrachloride to give 55.0 g. (98%) of the product. M.P. 175–176° C. (in a sealed tube). $\nu_{C=O}$ 1710 cm.$^{-1}$.

o-chlorophenylpropiolic acid (V)

To a solution of 70.5 g. (0.20 mole) of α,β-dibromo-β-(o-chlorophenyl)propionic acid and 252 ml. of methanol was added a cold solution of 49 g. (0.19 mole) of potassium hydroxide in 42 ml. of water at room temperature and the mixture was refluxed for 2 hours with stirring. At the end of the period, the methanol was entirely distilled off at atmospheric pressure with stirring and the residue was dissolved in 840 ml. of water, the aqueous solution being treated with active carbon and acidified with conc. hydrochloric acid under cooling. The white precipitate which separated was filtered and washed with water to give 36.0 g. (98%) of o-chlorophenylpropiolic acid. M.P. 130–132° C. $\nu_{C\equiv C}$ 2250 cm.$^{-1}$, $\nu_{C=O}$ 1683 cm.$^{-1}$.

Ethyl o-chlorophenylpropiolate (VI)

To a solution of 40.0 g. (0.222 mole) of o-chlorophenylpropiolic acid and 200 ml. of absolute ethanol was slowly added 10 ml. of conc. sulfuric acid under cooling and the mixture was refluxed for 4 hours. An excess of the ethanol was removed by distillation under reduced pressure, the residue being poured into 600 ml. of ice-water. The aqueous mixture was neutralized with aqueous sodium bicarbonate solution and extracted with three 100-ml. portions of ether. The combined extracts were washed with water and dried with anhydrous sodium sulfate. The solvent was evaporated off and the oily residue was distilled under reduced pressure to give 25.5 g. (55%) of ethyl o-chlorophenylpropiolate. B.P. 116–118° C./0.2 mm. $\nu_{C=O}$ 1703 cm.$^{-1}$.

Ethyl 2-(o-chlorophenyl)-4-methylthiophene-3-carboxylate (VII)

A mixture of 25.5 g. (0.125 mole) of ethyl o-chlorophenylpropiolate, 11 g. (0.125 mole) of acetonyl mercaptane, 12 g. (0.125 mole) of sodium tert. butoxide and 150 ml. of benzene was heated at 80–85° C. for 6 hours. After cooling the reaction mixture was poured into 500 ml. of cold water, neutralized with dil. hydrochloric acid and extracted with three 100-ml. portions of benzene. After the combined benzene extracts were washed three times with 100 ml. of water, the organic solvent was removed under diminished pressure. Distillation of the residue gave 17 g. (49%) of the crude ester which was used for the next reaction without further purification. B.P. 133–145° C./1.0 mm. $\nu_{C=O}$ 1700 cm.$^{-1}$.

2-(o-chlorophenyl)-4-methylthiophene-3-carboxylic acid (VIII)

A mixture of 17 g. (0.06 mole) of ethyl 2-(o-chlorophenyl)-4-methylthiophene-3-carboxylate, 5 g. (0.09 mole) of potassium hydroxide in 100 ml. of ethanol was refluxed for 5 hours on a steam bath. The solvent was removed in vacuo, the residue being dissolved in 300 ml. of water. The solution was treated twice with active carbon and the filtrate was acidified with dil. hydrochloric acid to afford the thiophene acid which was recrystallized from ethanol-water (3:1). Yield 6.14 g. (41%). M.P. 139–140° C. $\nu_{C=O}$ 1670 cm.$^{-1}$.

$\lambda_{max.}^{EtOH}$ 267 mμ (ε 9,000)

Analysis.—Calcd. for $C_{12}H_9ClO_2S$: C, 57.03; H, 3.59. Found: C, 57.26, 56.80; H, 3.91, 4.13.

2-(o-chlorophenyl)-4-methylthiophene-3-carbonyl chloride (IX)

2 - (o - chlorophenyl) - 4 - methylthiophene - 3 - carboxylic acid (3 g., 0.012 mole) and thionyl chloride (5 ml.) were refluxed for one hour on a steam bath. The excess thionyl chloride was removed at reduced pressure. Distillation of the resulting residue gave 2.35 g. (73%) of the acid chloride. B.P. 126–128° C./0.8 mm. $\nu_{C=O}$ 1753 cm.$^{-1}$.

Sodium 6-[2-(o-chlorophenyl)-4-methylthiophene-3-carboxamido]-penicillanate (X)

A solution of 2.34 g. (0.0087 mole) of the acid chloride in 50 ml. of dry acetone was added over a period of 30 minutes to a rapidly stirred mixture of 2 g. (0.0238 mole) of sodium bicarbonate, 1.88 g. (0.0087 mole) of 6-APA, 100 ml. of water and 50 ml. of acetone, the temperature being maintained at 0° C. The mixture was stirred for one hour at room temperature. The reaction mixture was extracted with a total of 100 ml. of ether in two portions, the ether extracts being discarded. The aqueous phase was layered with 50 ml. of ethyl acetate and acidified with dil. hydrochloric acid under vigorous stirring. Four additional extractions using 200 ml. of ethyl acetate were made. The combined ethyl acetate extracts were dried with sodium sulfate and then calcium chloride. To the filtrate was added 4.5 ml. of 35% SEH solution and the mixture was concentrated to 10 ml. volume. To the concentrate was added 40 ml. of n-hexane to give 2.03 g. (49%). M.P. 168–170° C. (dec.). $\nu_{max}$ 1770, 1660, 1605, 1503, 1403 cm.$^{-1}$.

$\lambda_{max.}^{H_2O}$ 277 mμ (ε 8,000)

Analysis.—Calcd. for $C_{20}H_{18}ClN_2O_4S_2Na$: C, 50.79; H, 3.84; N, 5.93. Found: C, 52.18, 51.97; H, 5.30, 5.61; N, 5.47, 5.54.

This penicillin by the tube dilution technique in heart infusion broth exhibited a minimum inhibitory concentration of 0.4 mcg./ml. vs. the benzylpenicillin-resistant strain of Staphylococcus aureus BX-1633-2.

EXAMPLE 11

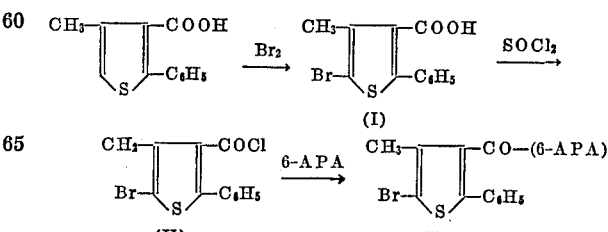

5-bromo-4-methyl-2-phenylthiophene-3-carboxylic acid (I)

To a solution of 5.0 g. (0.023 mole) of 2-phenyl-4-methylthiophene-3-carboxylic acid and catalytic amount of iron powder in 100 ml. of carbon tetrachloride was added dropwise a solution of 4.0 g. (0.025 mole) of bromine in 10 ml. of carbon tetrachloride at refluxing temperature. After the addition the reaction mixture was refluxed for 4 hours and extracted with three 50-ml. portions of saturated sodium bicarbonate solution. The combined alkaline solution was treated with active carbon and then acidified with dil. hydrochloric acid to give 6.8 g. (100%) of the bromothiophene. Recrystallization from ethanol-water gave a product melting at 165–166° C. $\nu_{C=O}$ 1670 cm.$^{-1}$.

$\lambda_{max}^{EtOH}$ 254 m$\mu$ ($\epsilon$ 7,000), 292 m$\mu$ ($\epsilon$ 9,050). NMR (100 mc.; in CCl$_4$, ref. TMS):$\tau$ (p.p.m.) 7.64 (s., 4–CH$_3$), 2.70 (s, phenyl ring protons), −1.66 (s., COOH).

Analysis.—Calcd. for C$_{12}$H$_9$BrO$_2$S: C, 48.50; H, 3.05. Found: C, 48.64, 48.89; H, 3.29, 3.35.

5-bromo-4-methyl-2-phenylthiophene-3-carbonyl chloride (II)

A mixture of 2.7 g. (0.009 mole) of 5-bromo-4-methyl-2-phenylthiophene-3-carboxylic acid and 5 ml. of thionyl chloride in 15 ml. of absolute methylene chloride was refluxed for one hour. The solvent being removed, the residue was distilled under reduced pressure to give 2.35 g. (82%) of the acid chloride. B.P. 145° C./0.4 mm. $\nu_{C=O}$ 1745, 1765 cm.$^{-1}$.

Sodium 6-(5-bromo-4-methyl-2-phenylthiophene-3-carboxamido)-penicillanate (III)

A solution of 2.35 g. (0.0075 mole) of 5-bromo-4-methyl-2-phenylthiophene-3-carbonyl chloride in 30 ml. of dry acetone was added at 0–5° C. over a period of 10 minutes to a rapidly stirred mixture of 1.62 g. (0.0075 mole) of 6-APA, 1.9 g. (0.0225 mole) of sodium bicarbonate, 30 ml. of water and 50 ml. of acetone. The mixture was stirred for one hour at room temperature. The reaction mixture was washed with 100 ml. of ether. The aqueous phase was covered with 50 ml. of ethyl acetate and acidified with dil. hydrochloric acid under cooling and stirring. The aqueous layer was subjected to further extractions with three 50-ml. portions of ethyl acetate. The combined ethyl acetate extracts were washed with 200 ml. of water and dried with anhydrous sodium sulfate, then with anhydrous calcium chloride. To the filtrate was added 3 ml. of 35% SEH solution to give 3.7 g. (95%) of the penicillin (sodium salt). M.P. 208–210° C. (dec.). $\nu_{max}$ 1755, 1635, 1600, 1510, 1400 cm.$^{-1}$.

$\lambda_{max}^{EtOH}$ 248 m$\mu$ ($\epsilon$ 8,600), 295 m$\mu$ ($\epsilon$ 8,100). Purity by IR 76%

Analysis. — Calcd. for C$_{20}$H$_{18}$BrN$_2$O$_4$S$_2$Na.H$_2$O: C, 44.86; H, 3.77; N, 5.23. Found: C, 44.87, 44.54; H, 4.54, 4.37; N, 512, 5.30.

This penicillin by the tube dilution technique in heart infusion broth exhibited a minimum inhibitory concentration of 0.8 mcg./ml. vs. the benzylpenicillin-resistant strain of Staphylococcus aureus BX–1633–2 and had a half-life in aqueous acid at pH 2.0 and 37° C. of 90–120 minutes.

What is claimed is:
1. A member selected from the group consisting of an acid having the formula:

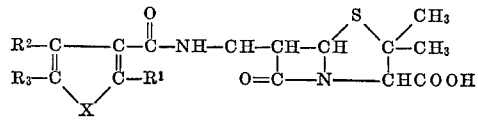

wherein X is a divalent radical selected from the group consisting of

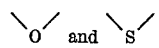

wherein R$^1$ and R$^2$ each represent a member selected from the group consisting of (lower)alkyl, chloro, bromo and the radical having the formula:

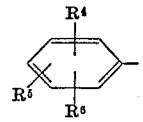

wherein R$^4$, R$^5$ and R$^6$ each represent a member selected from the group consisting of hydrogen, fluoro, bromo and chloro, and R$^3$ represents a member selected from the group consisting of hydrogen (lower)alkyl and the radical having the formula:

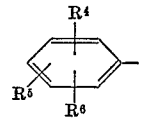

wherein R$^4$, R$^5$ and R$^6$ each represent a member selected from the group consisting of hydrogen, fluoro, bromo and chloro and, when bonded together as a benz group, R$^2$ and R$^3$ each represent vinyl; and nontoxic pharmaceutically acceptable salts thereof.

2. An acid of claim 1 having the formula:

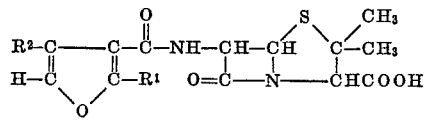

wherein R$^1$ and R$^2$ represent (lower)alkyl; and nontoxic, pharmaceutically acceptable salts thereof.

3. An acid of claim 1 having the formula:

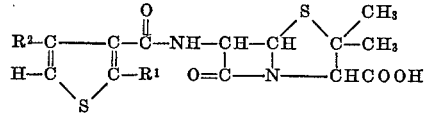

wherein R$^1$ and R$^2$ represent (lower)alkyl; and nontoxic, pharmaceutically acceptable salts thereof.

4. An acid of claim 1 having the formula:

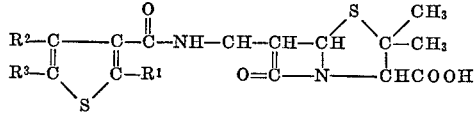

wherein R$^1$ and R$^3$ represent (lower)alkyl and R$^2$ represents halogen; and nontoxic, pharmaceutically acceptable salts thereof.

5. An acid of claim 1 having the formula:

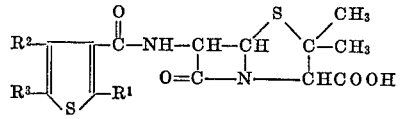

wherein of the groups R$^1$ and R$^2$ one group represents (lower)alkyl and the other group is a monovalent radical of the formula:

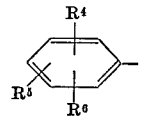

wherein R$^4$, R$^5$ and R$^6$ are each hydrogen, bromo or chloro, and R$^3$ is hydrogen or (lower)alkyl; and nontoxic, pharmaceutically acceptable salts thereof.

6. A compound of claim 5 wherein R$^3$ is hydrogen.

7. An acid of claim 1 having the formula:

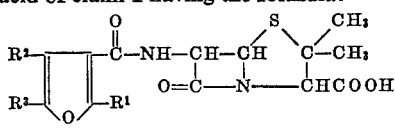

wherein of the groups $R^1$ and $R^2$ one group represents (lower)alkyl and the other group is a monovalent radical of the formula:

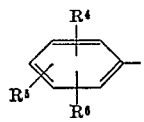

wherein $R^4$, $R^5$, $R^6$ are each hydrogen, bromo or chloro, and $R^3$ is hydrogen or (lower)alkyl; and nontoxic, pharmaceutically acceptable salts thereof.

8. A compound of claim 7 wherein $R^3$ is hydrogen.

9. A compound of claim 1 having the formula:

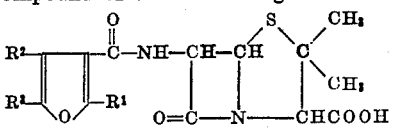

wherein $R^1$, $R^2$ and $R^3$ represent (lower)alkyl; and nontoxic, pharmaceutically acceptable salts thereof.

10. The compound of claim 1 which is 2,4,5-triphenyl-3-furylpenicillin.

11. The compound of claim 1 which is 2,4,5-trimethyl-3-furylpenicillin.

12. The compound of claim 1 which is 4,5-dimethyl-1-phenyl-3-furylpenicillin.

13. The compound of claim 1 which is 4-bromo-2,5-dimethyl-3-thienylpenicillin.

14. The compound of claim 1 which is 2-ethyl-3-benzofurylpenicillin.

References Cited
UNITED STATES PATENTS

| | | | |
|---|---|---|---|
| 3,174,964 | 3/1965 | Hobbs et al. | 260—239.1 |
| 3,210,337 | 10/1965 | Chow et al. | 260—239.1 |

NICHOLAS S. RIZZO, Primary Examiner

U.S. Cl. X.R.

260—999